June 18, 1929.  C. E. ANDERSON  1,717,539
HARROW
Filed May 31, 1928
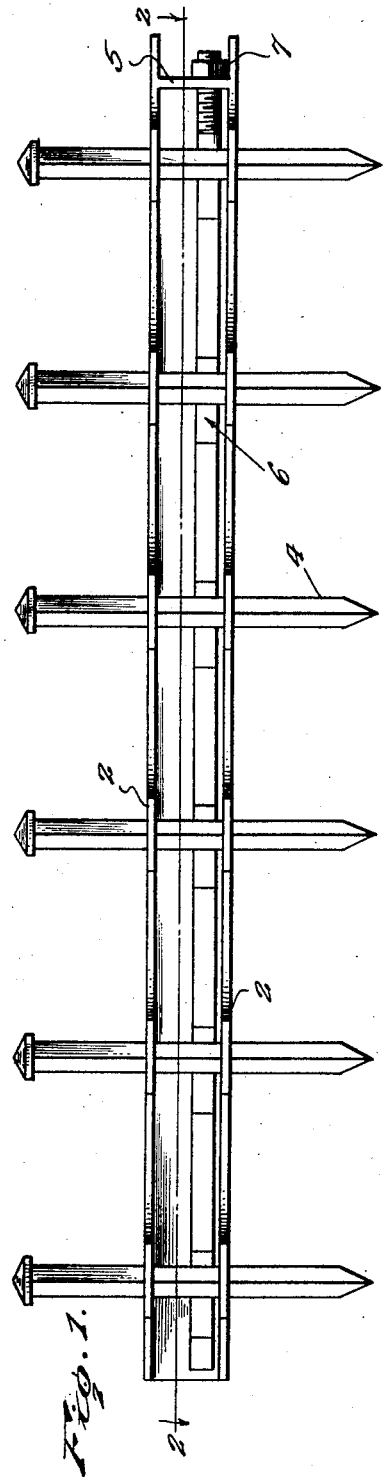
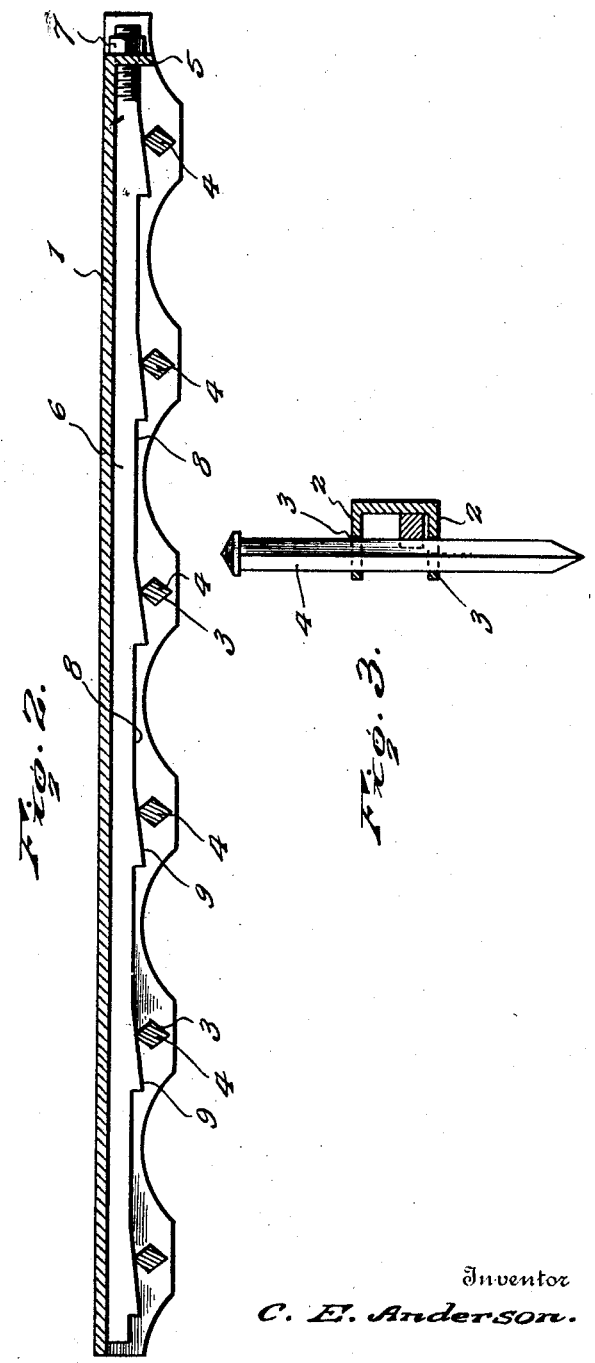
Inventor
C. E. Anderson.
By Lacey & Lacey, Attorneys Patented June 18, 1929.

1,717,539

UNITED STATES PATENT OFFICE.

CALVERT E. ANDERSON, OF ROCKPORT, INDIANA.

HARROW.

Application filed May 31, 1928. Serial No. 282,021.

The present invention is directed to improvements in harrows, and more particularly to the manner in which the teeth are secured to the frame bars.

The primary object of the invention is to provide a device of this character so constructed that the harrow teeth can be firmly secured to the bar and readily released therefrom when necessary.

Another object of the invention is to provide a device of this character which is exceedingly simple in construction, durable, efficient in operation, and one which can be manufactured at a very small cost.

With these and other objects in view, this invention resides in the novel features of construction, formation, combination and arrangement of parts to be hereinafter more fully described, claimed and illustrated in the accompanying drawing, in which:—

Figure 1 is a rear elevation of the device.

Figure 2 is a sectional view on line 2—2 of Figure 1.

Figure 3 is a transverse sectional view.

Referring to the drawing 1 designates one of the bars of the frame which is formed from channel iron, the horizontal webs 2 thereof being provided with alined rectangular openings 3 and in which are engaged the harrow teeth 4, said teeth being rectangular in cross section in order to snugly fit within the openings 3.

In one end of the bar is mounted a plate 5 in which is engaged the threaded end of the fastening bar 6, there being a nut 7 upon the threaded end of said bar in order that the bar 6 can be moved longitudinally within the channel of the bar 1 either to permit removal of the teeth or to maintain the same in fixed relation with respect to the bar 1.

The fastening bar 6 is provided upon its rear face with a plurality of recesses 8 which have beveled faces 9 which are adapted to engage the teeth 4 when the bar 6 is moved in one direction, and to disengage the teeth when the bar is moved in a reverse direction. It will be obvious that when the nut 7 is rotated in one direction the bar 6 will be drawn in a direction to cause the faces 9 to bindingly engage the teeth 4 thus holding the same firmly within the openings 3. In this manner it will be obvious that when the bar 6 is moved in one direction the teeth can be removed, and when moved in the reverse direction the teeth will be bindingly engaged in the openings 3 to prevent accidental disengagement thereof.

From the foregoing, it is thought that the construction, operation and many advantages of the herein described invention will be apparent to those skilled in the art, without further description, and it will be understood that various changes in the size, shape, and proportions and minor details of construction, may be resorted to without departing from the spirit or sacrificing any of the said advantages of the invention.

What is claimed is:

In a device of the class described, the combination with a channel bar, said bar having alined openings in its horizontal webs, teeth removably engaged in the openings, a plate carried by the channel bar, a fastening bar having one end adjustably connected with said plate, said fastening bar having beveled faces carried thereby for bindingly engaging the teeth when said fastening bar is adjusted to hold the teeth bindingly engaged in said openings.

In testimony whereof I affix my signature.

CALVERT E. ANDERSON. [L. S.]